United States Patent
Sun et al.

(10) Patent No.: US 7,004,613 B2
(45) Date of Patent: Feb. 28, 2006

(54) DISPLAY STRUCTURE

(75) Inventors: Ming-Shen Martin Sun, Hsinchu (TW); Kuo-Chung Lee, Yunlin Hsien (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 10/745,282

(22) Filed: Dec. 22, 2003

(65) Prior Publication Data

US 2004/0150996 A1 Aug. 5, 2004

Related U.S. Application Data

(63) Continuation-in-part of application No. 09/950,168, filed on Sep. 10, 2001, now abandoned.

(30) Foreign Application Priority Data

Dec. 28, 2000 (TW) .................................... 89128173 A

(51) Int. Cl.
*F21V 7/04* (2006.01)

(52) U.S. Cl. .................. 362/630; 362/223; 362/457; 439/457

(58) Field of Classification Search .......... 362/30–31, 362/223, 457, 97, 255–256, 307; 439/457
See application file for complete search history.

(56) References Cited

U.S. PATENT DOCUMENTS

| | | | | |
|---|---|---|---|---|
| 4,577,187 A | * | 3/1986 | Barr et al. ................... 361/681 |
| 4,669,688 A | * | 6/1987 | Itoh et al. ................... 248/74.2 |
| 4,799,133 A | * | 1/1989 | Strzalko et al. ............. 362/133 |
| 5,075,824 A | * | 12/1991 | Tan ............................. 362/31 |
| 5,209,478 A | * | 5/1993 | Simpson ................. 273/148 B |
| 5,239,450 A | * | 8/1993 | Wall ........................... 362/104 |
| 5,433,024 A | * | 7/1995 | Lerner ......................... 40/546 |
| 5,537,296 A | * | 7/1996 | Kimura et al. ............... 362/31 |
| 5,769,521 A | * | 6/1998 | Osawa et al. ................. 362/27 |
| 5,863,364 A | * | 1/1999 | Lin et al. ................... 156/73.1 |
| 5,876,107 A | * | 3/1999 | Parker et al. ................ 362/31 |
| 6,060,838 A | * | 5/2000 | Cantoni et al. ............. 315/159 |
| 6,079,838 A | * | 6/2000 | Parker et al. ................ 362/31 |
| 6,241,369 B1 | * | 6/2001 | Mackiewicz ................ 362/368 |
| 6,307,737 B1 | * | 10/2001 | Ogawa et al. ............. 361/682 |
| 6,383,013 B1 | * | 5/2002 | Ghesla et al. .............. 439/417 |
| 6,386,722 B1 | * | 5/2002 | Okumura ..................... 362/31 |
| 6,390,639 B1 | * | 5/2002 | Suzuki et al. ................ 382/31 |
| 6,441,874 B1 | * | 8/2002 | Saito et al. ................... 349/70 |
| 6,459,203 B1 | * | 10/2002 | Kim ............................ 315/56 |
| 6,545,732 B1 | * | 4/2003 | Nakano ........................ 349/58 |
| 6,595,651 B1 | * | 7/2003 | Jeong et al. .................. 362/31 |

FOREIGN PATENT DOCUMENTS

| | | | |
|---|---|---|---|
| JP | 56-149490 A1 | | 4/1955 |
| JP | 63048896 A | * | 3/1988 |
| JP | 03-104789 A1 | | 5/1991 |
| JP | 11-271769 A1 | | 10/1999 |
| JP | 2000-214441 A1 | | 8/2000 |
| KR | 1002080280000 | | 4/1999 |
| KR | 1002122740000 | | 5/1999 |

OTHER PUBLICATIONS

Exhibit A—Figure 1 of U.S. Patent 5863364 to Lin et al.*

* cited by examiner

*Primary Examiner*—Stephen Husar
*Assistant Examiner*—Jason Han
(74) *Attorney, Agent, or Firm*—Darby & Darby

(57) ABSTRACT

A display structure. The display structure has a substrate, a panel, a lamp disposed on the panel, a lead wire connected to the lamp, and an intermediate disposed between the lead wire and the substrate. The substrate has a first sliding portion and a first positioning portion. The intermediate has a clamping portion, a second sliding portion and a second positioning portion. When the lead wire is placed in the clamping portion, the intermediate is moved to an engaging position on the substrate by sliding the second sliding portion on the first sliding portion. Thus, the second positioning portion is engaged to the first positioning portion, and the intermediate is elastically deformed so that the lead wire is wedged by the clamping portion.

10 Claims, 4 Drawing Sheets

DISPLAY STRUCTURE

CROSS REFERENCE TO RELATED APPLICATION

This is a continuation-in-part application of co-pending U.S. patent application Ser. No. 09/950,168, which is hereby incorporated by reference in its entirety.

BACKGROUND OF THE INVENTION

1. Field of the Invention

This invention relates to a display structure. More particularly, this invention relates to a display structure provided an intermediate to clamp a lead wire of a lamp by wedging.

2. Description of Related Art

FIG. 1 and FIG. 2 are two perspective views showing two prior display units P1 and P2, respectively.

In FIG. 1, the display structure P1 comprises a case H1, a panel 2, a lamp 3, two lead wires 31(32) connected to the lamp 3, a plastic frame R1 and an elastic member T1 used for disposing on the lead wires 31(32).

When the lead wires 31(32) are pulled by an excessive force, the lead wires 31(32) cannot be tightly held by the elastic member T1, and the majority of the force acts on the lamp 3 directly via the lead wires 31(32). The lead wires 31(32) may be disconnected from the lamp 3 by the force.

In FIG. 2, the display structure P2 also comprises a case H2, a panel 2, a lamp 3, two lead wires 31(32) and a plastic frame R2. The display structure P2 differs from the display structure P1 in that the elastic member T1 is replaced by a tape T2, which is used for taping the lead wires 31(32) to the case H2. When the lead wires 31(32) are pulled by an excessive force, the tape T2 adhered to the case H2 is easily torn away, causing the lead wires 31(32) to disconnect from the lamp.

SUMMARY OF THE INVENTION

The primary object of this invention is to provide a display structure, which comprises a substrate, a panel, a lamp disposed on the panel, a lead wire connected to the lamp and an intermediate. The panel and the lamp are disposed on the substrate, and the lamp is disposed on the panel. The substrate has a first sliding portion and a first positioning portion. The intermediate, having a clamping portion, a second sliding portion and a second positioning portion, is disposed between the lead wire and the substrate. When the lead wire is placed in the clamping portion, the intermediate is moved to an engaging position on the substrate by sliding the second sliding portion on the first sliding portion. Thus, the second positioning portion is engaged to the first positioning portion, and the intermediate is elastically deformed so that the lead wire is wedged by the clamping portion.

BRIEF DESCRIPTION OF THE DRAWINGS

The present invention can be more fully understood by reading the subsequent detailed description and examples with reference made to accompanying drawings in which.

DETAILED DESCRIPTION OF THE PREFERRED EMBODIMENTS

Figure 1:
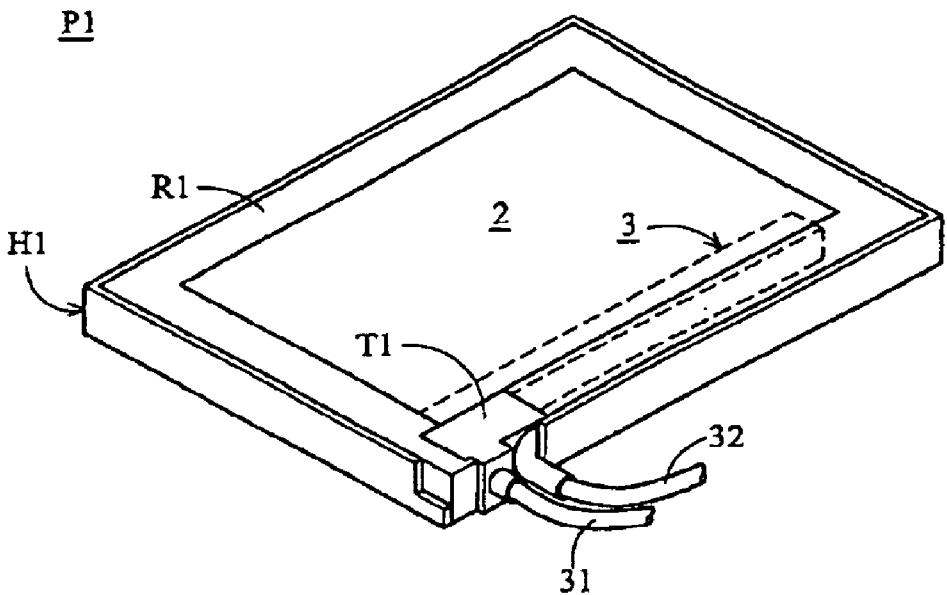
FIG. 1 is a perspective view showing a display unit (P1) according to the related art.
Figure 2:
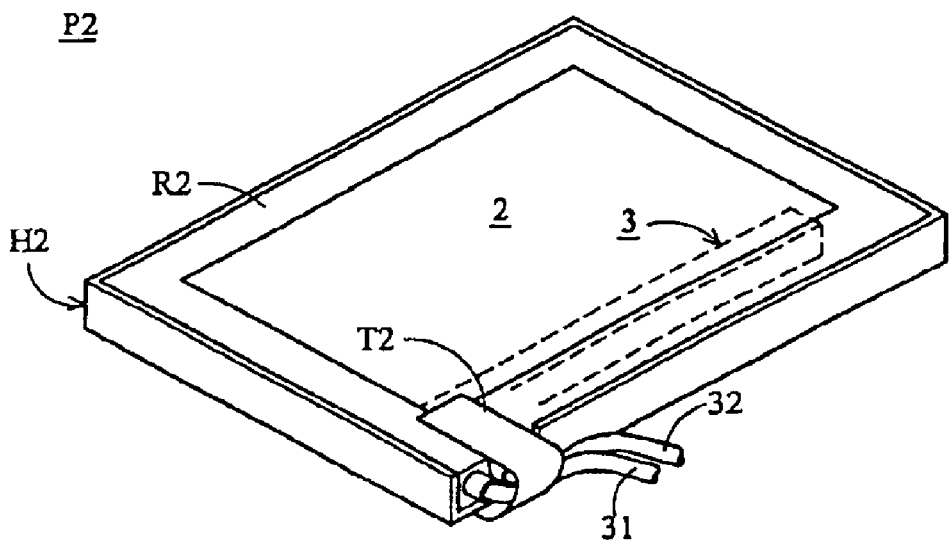
FIG. 2 is a perspective view showing another display unit (P2) according to the related art.
Figure 3:
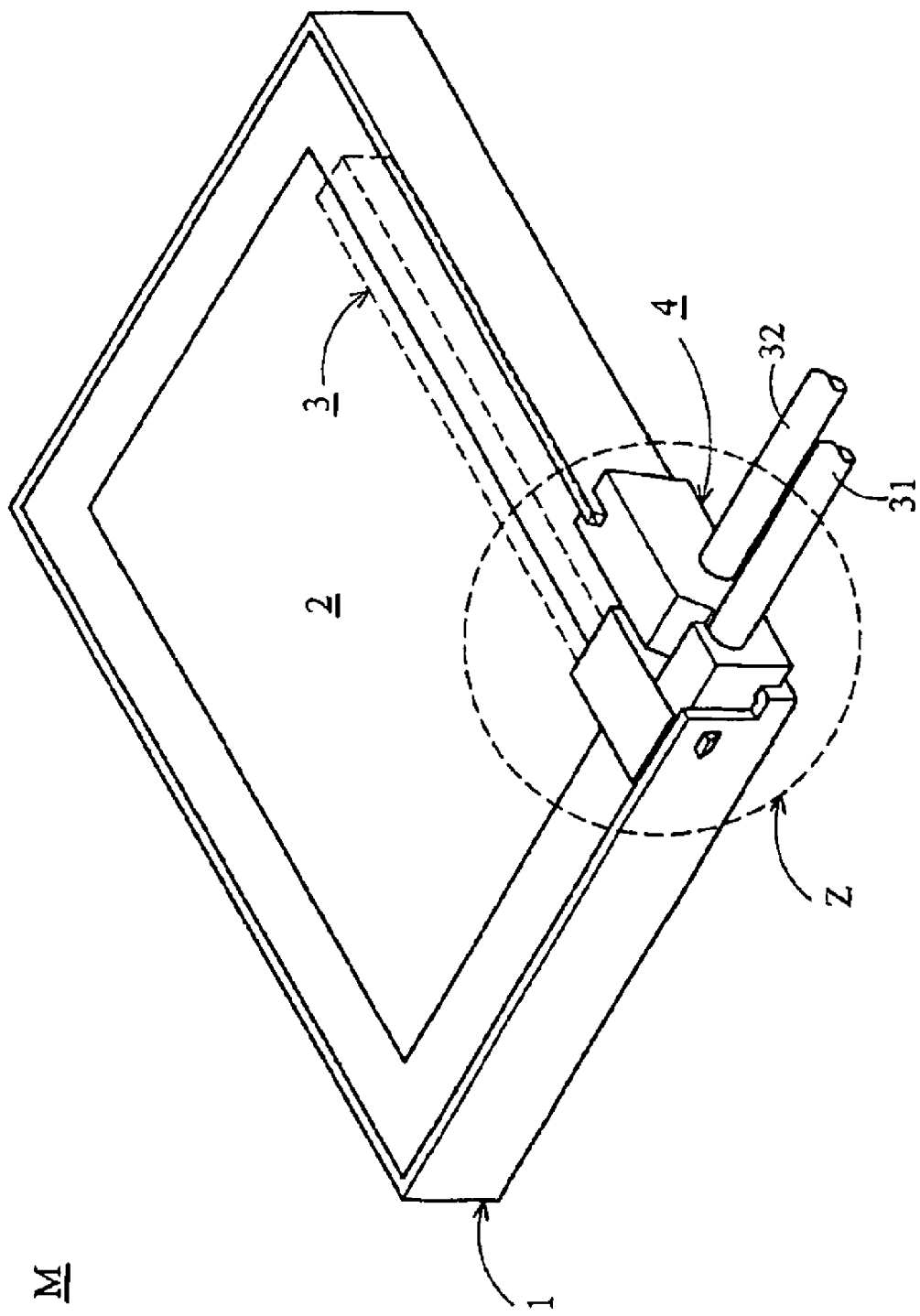
FIG. 3 is a perspective view showing a display structure (M) according to the present invention.

FIG. 3 is a perspective view showing a display structure M according to the present invention.

The display structure M comprises a substrate 1, a panel 2, a lamp 3, two lead wires 31(32) connected to the lamp 3 (in FIG. 4C), and an intermediate 4 used for clamping the lead wires 31(32) on the substrate 1. The panel 2 and the lamp 3 are disposed on the panel 2, and the lamp 3 is placed next to the panel 2. The assembly of the substrate 1 and the intermediate 4 is used as a clamping structure to hold the lead wires 31(32) tightly in the display structure M.

Figure 4A:
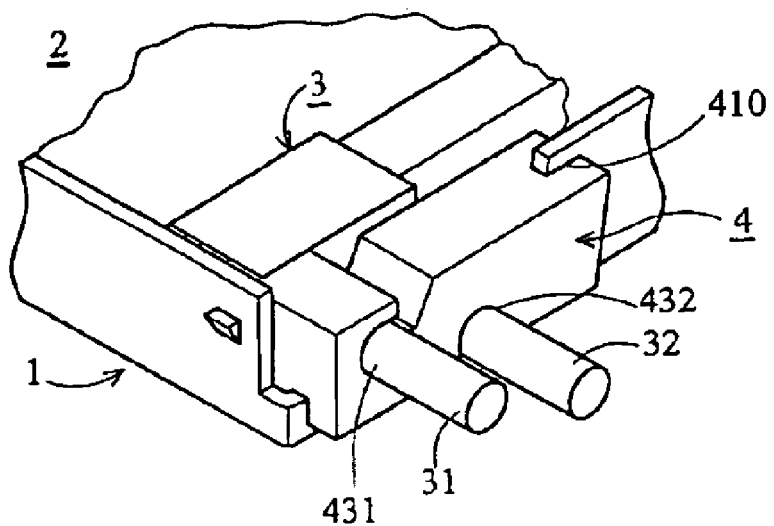
FIG. 4A is an enlarged perspective view of a region (Z) according to FIG. 3.
Figure 4B:
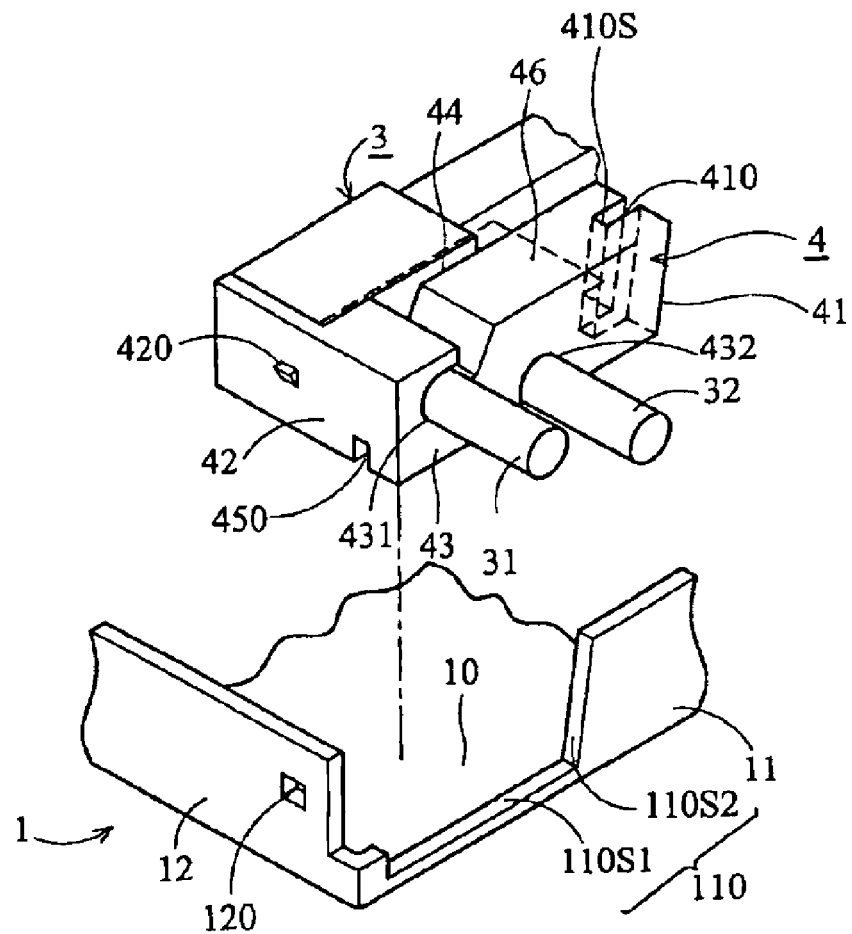
FIG. 4B is a partially exploded view according to FIG. 4A.

FIG. 4A is an enlarged perspective view of a region Z according to FIG. 3, in which the intermediate 4 is placed in an engaging position. FIG. 4B is a partially exploded view according to FIG. 4A, and FIG. 4C is a fully exploded view according to FIG. 4A.

Figure 4C:
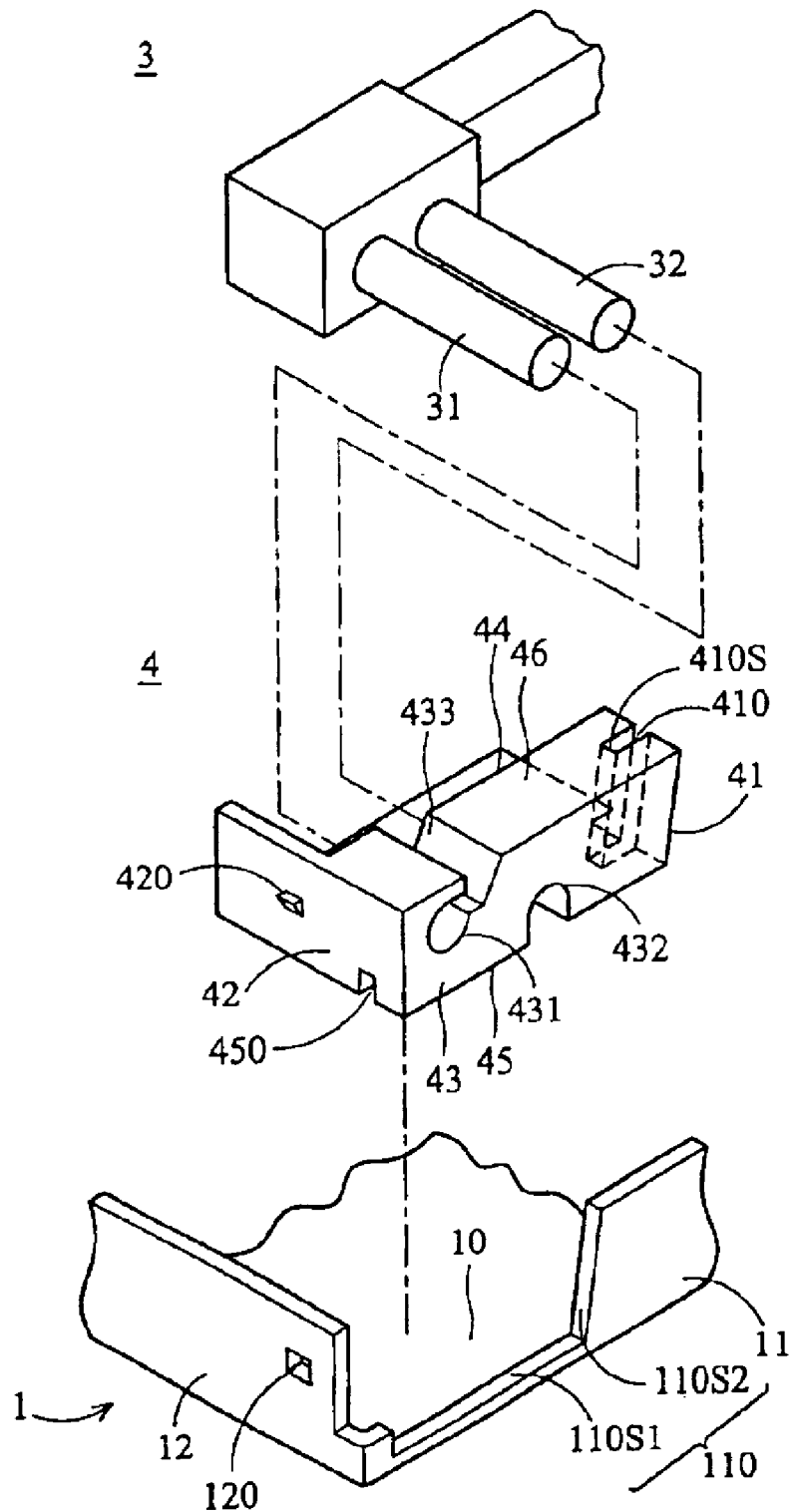
FIG. 4C is a fully exploded view according to FIG. 4A.

In FIG. 4C, the substrate 1 comprises a bottom surface 10 and two sidewalls 11 and 12. A recess 110 with two end surfaces 110S1, 110S2 is formed on the intersection between the sidewalls 11 and 12, and a hole 120, which serves as a first positioning portion, is formed on the sidewall 12. The level of the end surface 110S1 (third positioning portion) is higher than the one of the bottom surface 10, and the end surface 110S2 on the sidewall 11, which serves as a first sliding portion of the substrate 1, is a slanted surface connected to the end surface 110S1 (third positioning portion). The recess 110 is used for positioning the intermediate 4 in the engaging position on the substrate 1.

The intermediate 4, made of elastic material such as rubber and provided with end surfaces 41, 42, 43, 44, 45 and 46, comprises a second sliding portion 410, a bump 420, a first clamping portion 431 and a second clamping portion 432. The second sliding portion 410 is a slot formed on the end surface 41 (a third surface) and provided with a slanted surface 410S by passing the end surface 46 and 45. The first clamping portion 431 has a substantially V-shaped slot formed on the end surface 46 (first surface) by passing the end surface 43 and 44. The second clamping portion 432 has a slot formed on the end surface 45 (a second surface) by passing the end surface 43 and 44. The bump 420, which serves as a second positioning portion corresponding to the first positioning portion (i.e. the hole 120), is formed on the end surface 42. Further, a positioning slot 450 is formed on the end surface 45.

Referring to FIG. 4B, the lamp 3 with two lead wires 31(32) is placed and positioned on the intermediate 4 before the intermediate 4 is positioned on the substrate 1. As the lamp 3 is mounted on the intermediate 4, the lead wires 31, 32 are respectively received in the clamping portions 431, 432.

Referring to FIG. 4A and FIG. 4B, the intermediate 4 enclosed with the lamp 3 is moved to the engaging position on the substrate 1 by sliding the second sliding portion 410 of the intermediate 4 on the end surfaces 110S2 of the first sliding portion 110S2. The end surface 110S1 of the substrate 1 is then received in the positioning slot 450 of the intermediate 4 to fix the intermediate 4 in the engaging position, and the bump 420 is received and engaged by the hole 120 of the sidewall 12 of the substrate 1.

Further, as the second sliding portion 410 of the intermediate 4 slides on the end surfaces 110S2 of the first sliding portion 110, a wedging effect occurs. The wedging effect generates force sufficient to keep the intermediate 4 compressed and squeezing the openings of each of the first clamping portion 431 and the second clamping portion 432 until the bump 420 is positioned and engaged to the hole 120, and thus the lead wires 31, 32 can be properly wedged and fixed by the first clamping portion 431 and the second clamping portion 432.

Thus, when the lead wires 31, 32 are pulled by an excessive or abrupt force, the majority of the force is directly absorbed by the intermediate 4 and transmitted to the substrate 1.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A display structure, comprising:
   a substrate having a first sliding portion and a third positioning portion;
   a panel;
   a lamp disposed adjacent to the panel;
   a first lead wire and a second lead wire, connected to the lamp; and
   an intermediate disposed between the first lead wire and the substrate, the intermediate having a first clamping portion formed on a first surface of the intermediate and enclosing the first lead wire, a second clamping portion formed on a second surface thereof opposite to the first surface and enclosing the second lead wire, a second sliding portion formed on a third surface of the intermediate and sliding on the first sliding portion, and a positioning slot formed on the second surface and corresponding to the third positioning portion,
   wherein the intermediate moves to an engaging position by sliding the second sliding portion on the first sliding portion so that the positioning slot is engaged to the third positioning portion.

2. The display structure as claimed in claim 1, wherein the first clamping portion is a slot, formed corresponding to the first lead wire, and locking the first lead wire by elastic force.

3. The display structure as claimed in claim 1, wherein the second clamping portion is a slot, formed corresponding to the second lead wire, and locking the second lead wire by elastic force.

4. The display structure as claimed in claim 1, wherein the first sliding portion and the third positioning portion have the same width.

5. The display structure as claimed in claim 1, wherein the length of the third positioning portion is shorter than the length of the positioning slot.

6. A clamping structure for clamping a first lead wire and a second lead wire thereon, comprising:
   a substrate having a first sliding portion and a third positioning portion;
   an intermediate disposed between the first lead wire and the substrate, the intermediate having a first clamping portion formed on a first surface of the intermediate and enclosing the first lead wire, a second clamping portion formed on a second surface thereof opposite to the first surface and enclosing the second lead wire, a second sliding portion formed on a third surface of the intermediate and sliding on the first sliding portion, and a positioning slot formed on the second surface and corresponding to the third positioning portion,
   wherein the intermediate moves to an engaging position by sliding the second sliding portion on the first sliding portion so that the positioning slot is engaged to the third positioning portion.

7. The clamping structure as claimed in claim 6, wherein the first clamping portion is a slot, formed corresponding to the first lead wire, and locking the first lead wire by elastic force.

8. The clamping structure as claimed in claim 6, wherein the second clamping portion is a slot, formed corresponding to the second lead wire, and locking the second lead wire by elastic force.

9. The clamping structure as claimed in claim 6, wherein the sliding groove and the positioning slot have the same width.

10. The clamping structure as claimed in claim 6, wherein the intermediate is made of elastic material.

* * * * *